Nov. 16, 1948. F. H. SCHNEIDER 2,453,939
COOKING OVEN
Filed July 27, 1944 5 Sheets-Sheet 3

Inventor:
Frank H. Schneider,
by Cpudley Chittick
Attorney

Nov. 16, 1948.　　　　F. H. SCHNEIDER　　　　2,453,939
COOKING OVEN
Filed July 27, 1944　　　　　　　　　　　　　5 Sheets-Sheet 4
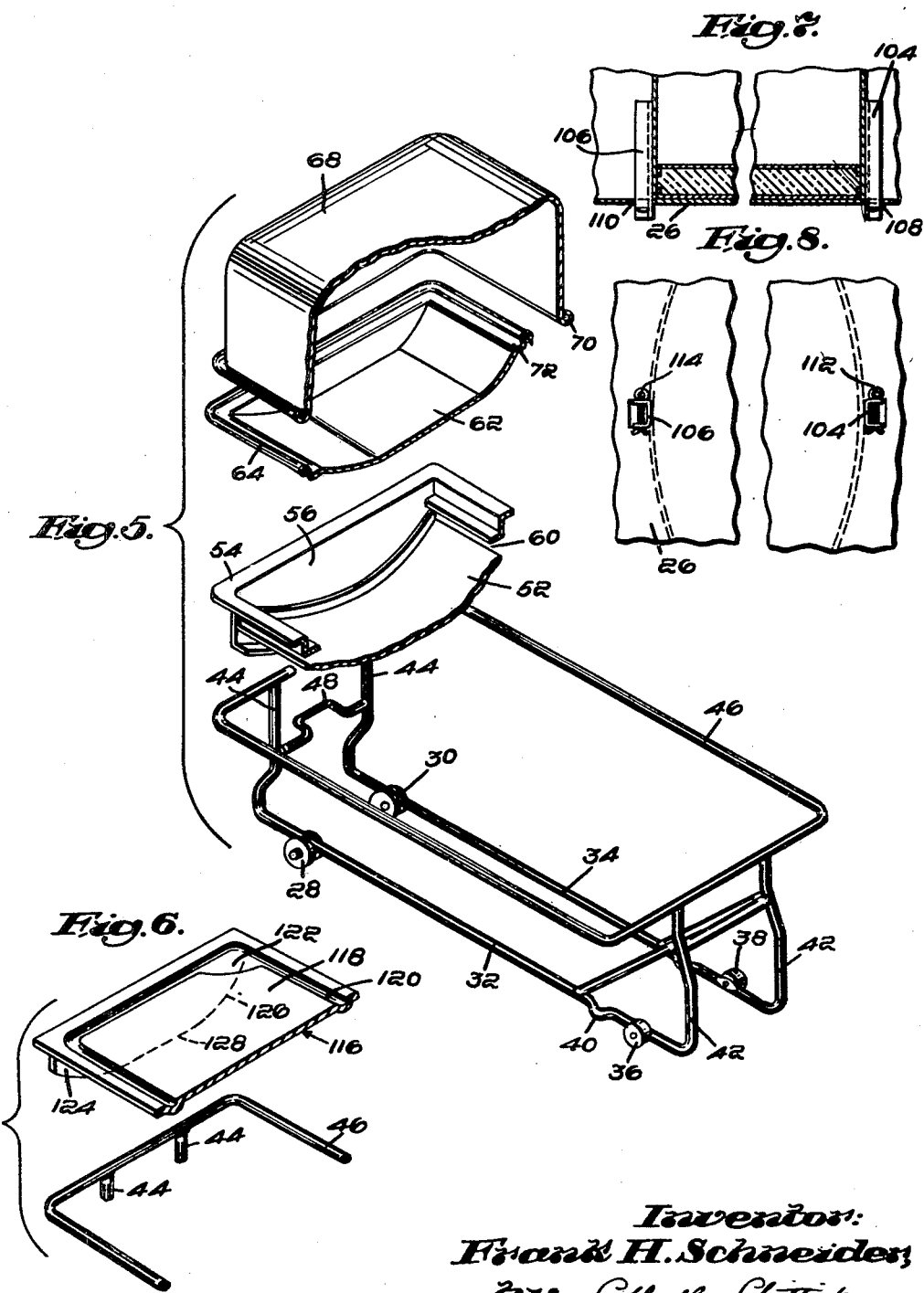
Inventor:
Frank H. Schneider,
by Yardley Chittick
Attorney

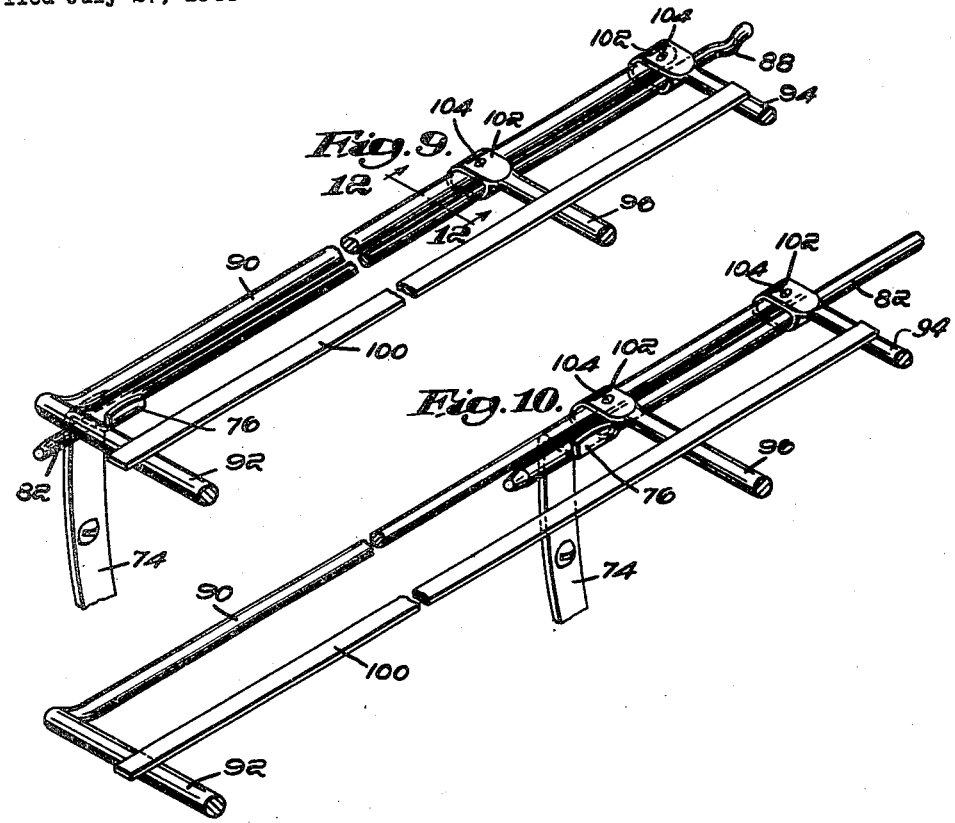
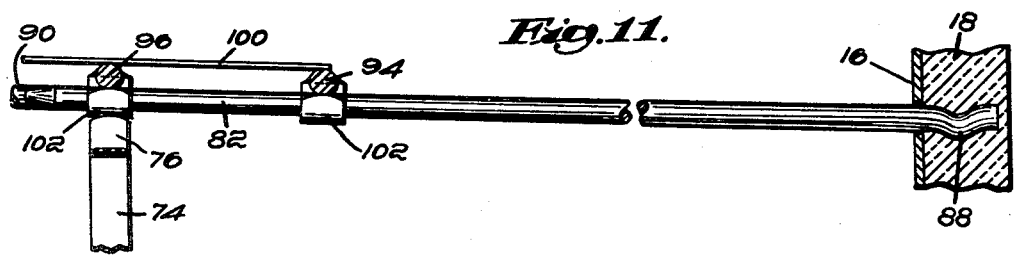
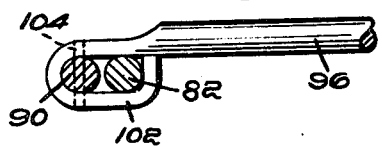

Patented Nov. 16, 1948

2,453,939

UNITED STATES PATENT OFFICE 2,453,939

COOKING OVEN

Frank H. Schneider, Gardner, Mass., assignor to Florence Stove Company, Gardner, Mass., a corporation of Massachusetts Application July 27, 1944, Serial No. 546,811

9 Claims. (Cl. 126—39)

This invention relates to cooking ovens. One of the objects of the invention is to provide a construction which will give even and uniform distribution of heat throughout the oven, so that food cooked therein will be cooked evenly and uniformly regardless of the position at which it may be located within the oven.

Heretofore, in the customary rectangular oven it has been found that the temperatures along the walls differ from those at the center of the oven, and, accordingly, uniform results have not always been obtainable.

In the present invention it is proposed to use a cylindrical oven with a heat supply at the bottom which will be directed upwardly along the walls and then reflected back to the center so that substantially uniform temperatures will prevail throughout the entire interior.

A further object of the invention is the provision of a supporting framework at the lower portion of the oven which may carry either a roasting pan or a griddle, and which may be slidably withdrawn to provide easy access to the articles being cooked.

A further object of the invention is the incorporation in the oven of racks which are not only entirely secure from the standpoint of supporting objects within the oven, but also may be withdrawn almost their entire length, to facilitate inspection or removal of the articles being cooked.

A further object of the invention is the provision of racks, which, while normally held against accidental withdrawal from the oven, are rendered removable by merely raising the front end of the rack through a slight angle.

These and other objects of the invention will become more apparent as the description proceeds with the aid of the accompanying drawings, in which Fig. 1 is a front view of a typical form of oven with the door open.

Fig. 5 is an exploded view of the supporting frame, carrying a baffle, roasting pan and cover.

Fig. 6 is a fragmentary, exploded, and broken-away view of the supporting frame and griddle.

Fig. 7 is a broken-away horizontal cross-sectional view, showing means for retaining a removable oven liner in place.

Fig. 8 is a rear enlarged elevation of the construction shown in Fig. 7.

Fig. 9 is a perspective view of part of the rack and supporting structure.

Fig. 10 shows the rack of Fig. 9 in withdrawn position.

Fig. 11 shows the rack raised through a slight angle to permit withdrawal from the oven.

Fig. 12 is a vertical section on the line 12—12 of Fig. 9.

Figure 1:
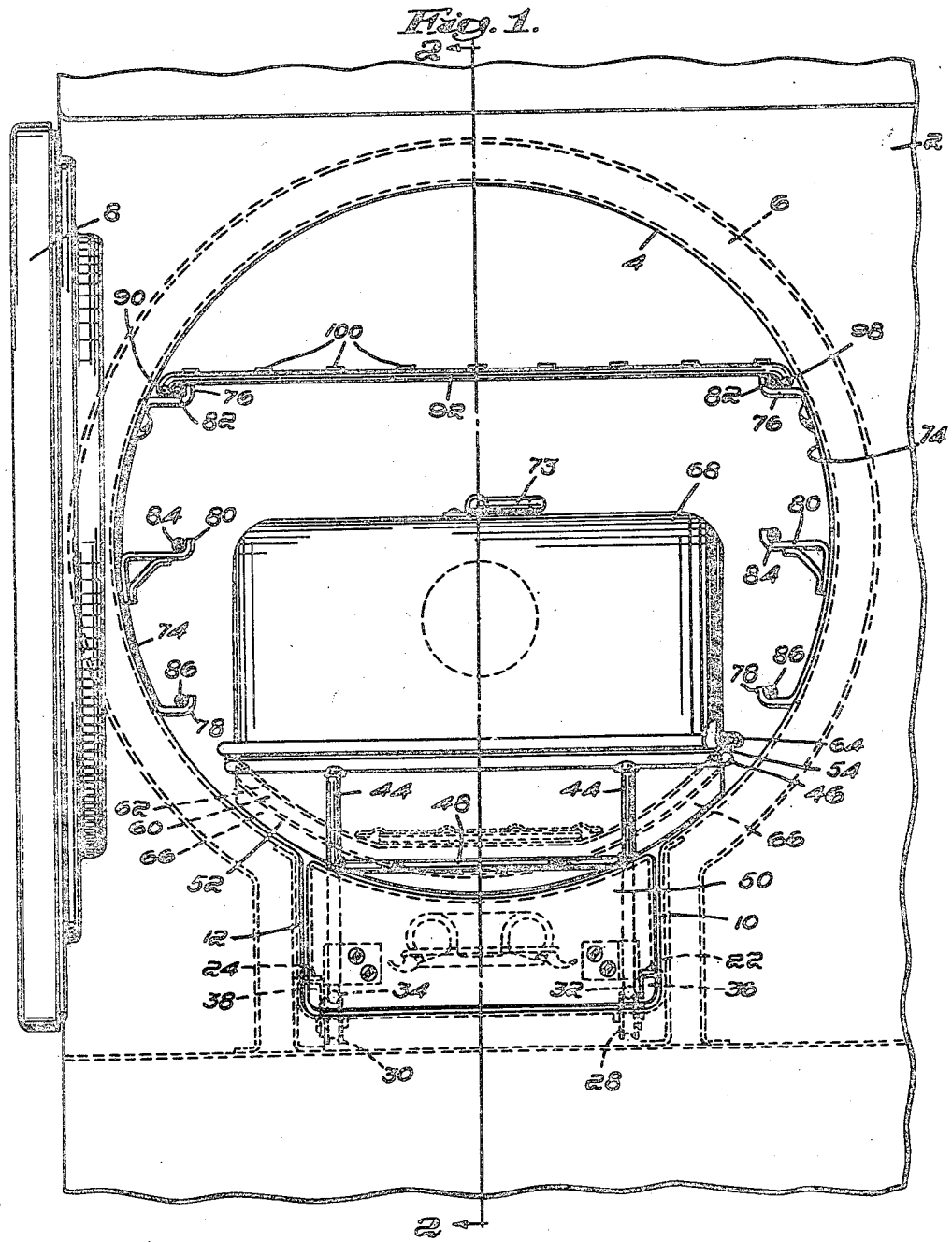

Referring now to Fig. 1, there is shown a typical stove supporting structure 2, which has positi.. ..ed therein a cylindrical stove liner 4. This liner may be preferably formed of one piece for simplicity and economy of manufacture, and will fit within the stove shell in the ordinary manner. Surrounding the liner 4 is adequate insulation so that the heat lost may be minimized. A door 8 is shown at the left in open position.

Figure 2:
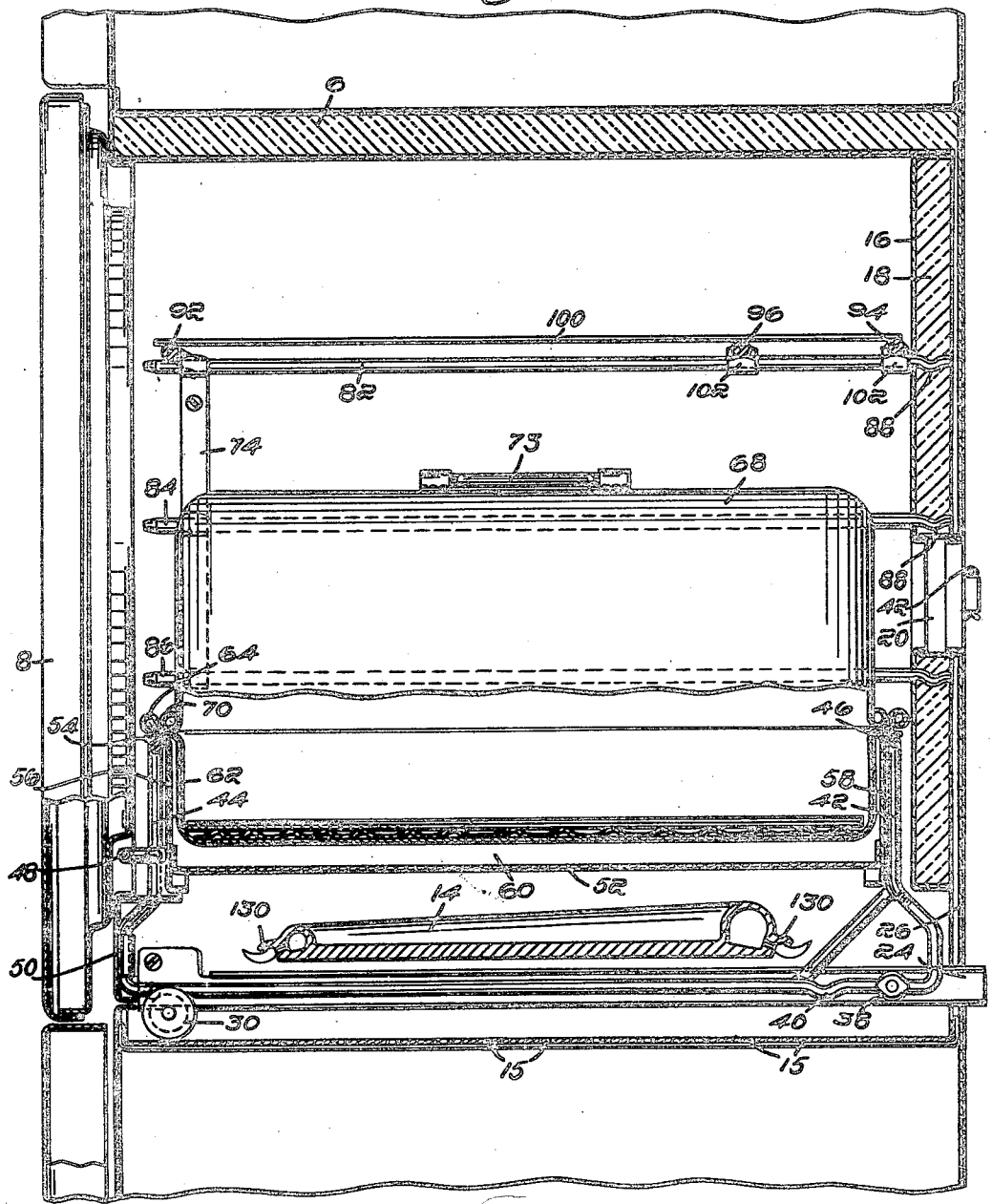
Fig. 2 is a vertical cross section on the line 2—2 of Fig. 1.

The lower portion of the oven has an opening formed by turning the walls downwardly to form vertical bottom walls at 10 and 12. Between these two walls is positioned a source of heat, which may take the form of a gas burner 14 as shown, or it may be an electrical heating element or an oil burner if such source of heat is desired. Air vents 15 are provided in the bottom under the burner for the admission of air necessary to maintain combustion. As can be seen in Fig. 2, the oven has a rear wall 16 which is likewise insulated at 18. A flue and passage way through the rear wall at 20 connects with the flue leading to the chimney.

A supporting frame which is adapted to carry a roasting pan or grill is shown in detail in Figs. 1, 2 and 5. This supporting frame and the track on which it may be slidably withdrawn is constructed as follows:

On each of the side walls 10 and 12 are secured channels 22 and 24. These channels extend from a position through the rear wall of the shell to a location very close to the front of the oven. Near the front end of the channels are grooved rollers 28 and 30 and in the grooves of these rollers rest longitudinally extending rods 32 and 34. The back ends of these rods have fixed thereto rolls 36 and 38 located between the flanges of the channels 22 and 24. The rods 32 and 34 have downwardly bent portions 40 which are designed to engage the grooved rolls 28 and 30 when the rods are drawn outwardly from the oven to provide means for limiting the outward movement of the rods.

The rods 32 and 34 are extended upwardly to form the structure shown in Fig. 5. There are rear vertical supports 42, front vertical supports 44, and the rectangular frame 46 carried thereby. A handle 48 is provided at the front to facilitate withdrawal of the frame. A front panel 50 closes the lower open front area so that the remaining open area above is cylindrical. Panel 50 is attached to the lower portions of the front vertical supports 44. Panel 50, when in closed position and flush with the adjacent front surface of the oven, minimizes the amount of heat that would otherwise escape from the burner area.

The burner 14 is fixed in position, and withdrawal of the frame does not in any way interfere with the burner operation. In order that the heat from the burner may not impinge directly on the bottom of the cooking surface, there is interposed a baffle 52 which is carried by the supporting frame shown broken away in Fig. 5. It will be noticed that this construction provides front and rear walls 56 and 58 (see Fig. 2), which limit the amount of heat lost in those directions. The baffle 52 is not connected at its sides with the longitudinally extending portion of frame 54. Thus, when a cooking surface such as a roasting pan is positioned above the baffle, there is provided a space between the baffle and pan, closed at the ends and open at the sides as at 60.

A roasting pan may be used in conjunction with the baffle construction. Such a roasting pan is shown in broken away exploded perspective in Fig. 5. The pan, generally referred to as 62, has curled edges 64 which are positioned on the edge 54 of the underlying baffle supporting frame. The bottom of pan 62 is separated at a sufficient distance from baffle 52 so that there is adequate opportunity for the heat from the burner to pass therebetween. The heat from the burner will, of course, impinge directly on baffle 52 and heat will be transferred to the baffle to heat the area in the space immediately below the pan 62, in addition to such heat as may be circulating therewithin.

The passage 66 between the oven wall and baffle 52 enables the heat from the burner to pass upwardly in a circular direction along the oven wall. As the heat moves up through the oven, it expands inwardly, and is also reflected downwardly from the upper curved portions of the oven to produce a substantially uniform temperature through the entire oven volume. Thus, when the roasting pan is being used, heat will be supplied to the under side of the pan, and, in addition, will be reflected downwardly from the upper oven surfaces on the food being cooked to provide a uniform cooking temperature.

If it is desired to utilize a cover with the roasting pan, such cover may be provided and used in the manner shown in Figs. 1, 2 and 5. The cover is illustrated at 68 and has a beaded lower edge at 70, which is designed to fit within the rolled edge 64 on flange 72 of roasting pan 62. A handle 73 is provided to facilitate removal of the cover when the frame and pan have been withdrawn from the oven. When the cover is used the two lower oven racks must be removed, as they would interfere with the positioning of the cover.

The oven rack structure is shown in the several figures, and one suitable form is disclosed as consisting of a strip of metal 74 of suitable strength formed into hook-like shapes 76 and 78 at its upper and lower ends. Intermediate its upper and lower ends another hook 80 may be attached to strip 74, as illustrated, and the whole unit may be secured to the oven wall by welding, riveting or bolting, or in any other convenient manner. The inner ends of the hooks 76, 78 and 80 are aligned vertically, so that the oven racks may be interchangeable from one elevation to another.

Supported by the hooks in the front and by the rear oven wall at the back are rods 82, 84 and 86. These rods are secured for pivotal movement to the rear wall in any convenient manner, but the form shown provides a simple expedient. The rods are merely deformed at 88 to such an extent that they may be passed through the rear wall when directed at a suitable angle thereto, but after being inserted cannot be withdrawn nor pulled out in a straight forward or slightly angled direction.

These rods provide the supports along which the removable racks can move. The supporting racks are best shown in Figs. 9-12. In Fig. 9 is shown in perspective a detail of the uppermost rack. The rack is rectangular in shape and has a side bar 90, a front bar 92, a rear bar 94, and an intermediate bar 96. There is, of course, a bar on the opposite side corresponding to bar 90 shown in Fig. 1 at 98, which completes the major supporting portions of the rack. Running from front to back are a plurality of flat supporting strips 100, which are clearly shown in Fig. 1. These may be welded or otherwise secured to crossbars 92, 94 and 96. Bars 90 and 98 lie alongside of fixed bars 82.

In order to prevent the rack from falling downwardly as it is slid out from the oven along rods 82, the cross bars 94 and 96 are flattened at their ends and bent in a loop formation, as shown at 102 in Fig. 12. The fit about rod 82 and bar 90 is sufficiently free so that the rack may slide easily. Each loop 102 is definitely fixed with respect to bar 90 by means of the pin or rivet 104 that passes therethrough.

From the description of the rack thus far, it will be apparent that it may be drawn out from the oven to slide along rods 82 until it reaches the position shown in Fig. 10. At this point loop 102 of cross bar 96 comes into engagement with the inner edge of hook 76 so that further outward movement of the rack is prohibited. The rack maintains its horizontal position because loop 102 of cross bar 94 holds the rear end of the rack down in its normal position alongside of rod 82, while bar 82 supports cross bar 96 to prevent downward movement at that point. Bars 90 and 98 in cantilever position are sufficiently strong to carry such normal loads as are imposed on oven racks.

If it is desired to remove a rack from the oven, this result may be accomplished very easily after the rack has reached the position shown in Fig. 10. It is merely necessary to lift the front end of the rack through a few degrees, which will cause rod 82 to lift at its front end as it pivots about its rear end which is secured in the rear wall 16 by the deformed portion 88. As soon as rod 82 has been raised enough to permit loop 102 to clear the top edge of hook 76, as shown in Fig. 11, the rack may be drawn from the oven until the rear loop 102 has come off the end of rod 82. Thereupon rod 82 will fall back to its normal position, resting on hook 76.

Replacement of the rack is equally simple. The rearmost loops 102 are placed over rods 82, the rack is then raised a few inches until loops 102 clear hooks 76, whereupon the rack may be slid back into the oven to its original position.

In certain constructions it may be convenient to have the cylindrical portion of the oven removable from the supporting shell. This may be accomplished by providing a suitable sliding fit between the cylindrical part and the surrounding insulation, so that the whole unit may be withdrawn for cleaning. In order that the oven may not be dislocated inadvertently, it may be secured in place as shown in Figs. 2, 7 and 8. The small channels 104 and 106 are welded or otherwise attached to opposite sides of the oven to pass through suitable openings 108 and 110 in the back of wall 26 of the oven shell. These channels may have vertically disposed holes therethrough into which may be introduced cotter pins 112 and 114, which will adequately secure the oven in place.

Figure 3:
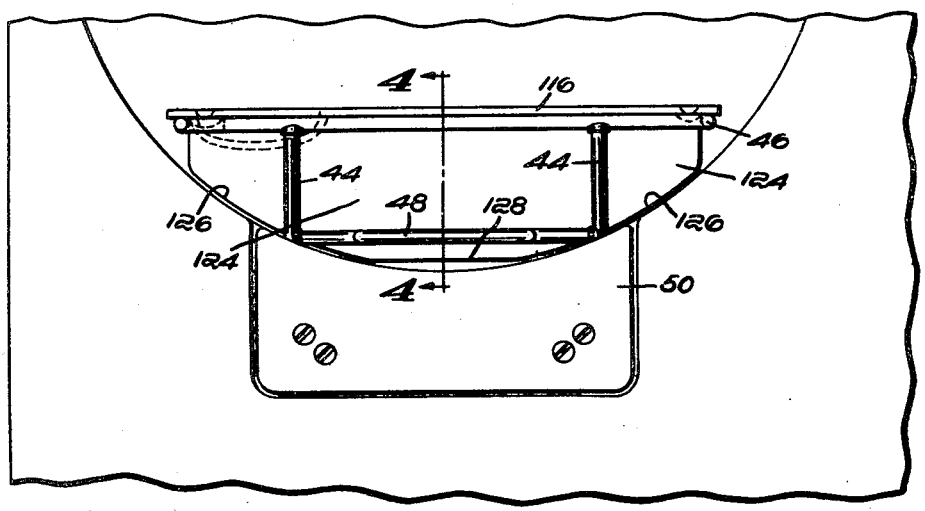
Fig. 3 is a fragmentary front elevation showing the supporting frame carrying a griddle.
Figure 4:
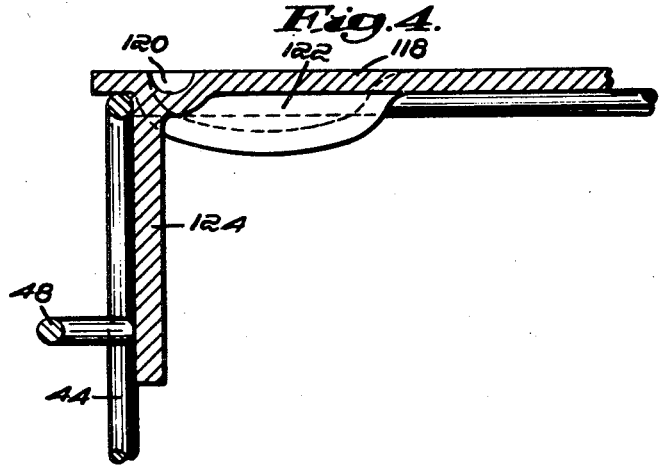
Fig. 4 is a vertical section on the line 4—4 of Fig. 3, showing details of the griddle and supporting frame construction.

If it is desired to substitute a griddle for the roasting pan, this may be done by the removal of the roasting pan 62 and the baffle 52, both of which are supported by the frame 46. In their place may be positioned a griddle as shown in Figs. 3, 4 and 6 at 116. This griddle may be of any suitable shape and material. An approved form will have a flat top surface 118 and a channel 120 extending about all four sides. At one corner of the griddle may be a depressed portion 122 for collecting juices or fats or other liquid which may accumulate.

In order to prevent loss of heat when the oven door is open and the griddle is in use, a vertically depending flange 124 is provided, which is curved at the sides as shown at 126 in Fig. 3, but is flat at the central portion at 128. By having a similar flange at the rear end of the griddle, it will be observed that on removal the griddle can be stood on these flanges which provide a suitable substitute for legs at the corners. The flange 124 is so shaped that it will not interfere with the withdrawal of the frame 46 if such action is desired.

The roasting pan, with or without the cover, and the griddle have been referred to as cooking surfaces, in that they both provide surface areas on which the food to be cooked is supported.

The burner 14 shown in Figs. 1 and 2 has burner openings that are directed downwardly under an overhanging lip 130, but any conventional type of burner may be used with equally good results. It is merely necessary that there be sufficient heat supplied to provide proper cooking when either the roasting pan or the griddle is used.

While a preferred form of my invention has been shown and described, it will be understood that the invention is not limited thereby, but only by the appended claims.

I claim:

1. The combination of an oven having a longitudinal opening through its bottom and a frame adapted to carry a cooking surface in said oven, said frame comprising a pair of spaced channels located below said opening, a roll in each channel, a roller alongside the front end of each channel, horizontal members each secured to one of said rolls and resting at its front end on one of said rollers, whereby said members may be longitudinally drawn along said channel, upwardly extending members passing through said opening into said oven and connected to said horizontal members and carrying on their upper ends a support, a transversely extending baffle carried by said support and located over said opening, a cooking surface carried by said support above said baffle, the said frame, baffle, and cooking surface adapted to be withdrawn as a unit from said oven.

2. An oven comprising a cylinder closed at its rear end and having its front end surrounded by a vertical front surface, an oven door adapted to close the front end of said oven and to rest against said surrounding front surface, said oven having an opening through its bottom which extends substantially the entire length thereof, side walls depending from the edges of said opening, and a bottom joining said side walls, a burner positioned in the area formed by said side walls and bottom and below said opening, a baffle conforming generally to the curvature of said oven located immediately above said burner and overlapping and spaced from those parts of the oven wall that are immediately adjacent said opening, said front surface cut away to permit access to the area below said opening, a supporting frame mounted within said opening for withdrawal therefrom, and a panel attached to the front of said frame substantially closing the cut-away area in said front surface when said supporting frame is in normal position in said oven.

3. The combination of an oven and a supporting frame withdrawable therefrom, comprising an opening through the bottom of said oven, a pair of tracks located below said opening, a frame slidable along said tracks having vertical members extending upwardly through said opening into said oven, a support carried by said upwardly extending members, a cooking surface removably mounted on said support, the bottom of said cooking surface overlying the lower portions of said oven adjacent said opening in spaced substantially parallel relationship, a baffle extending over said opening and below said cooking surface, said frame, baffle and cooking surface adapted to be withdrawn from said oven as a unit.

4. In combination, an oven including walls and closed at its rear end and having a door at its front end, an opening extending along the bottom of said oven, a source of heat positioned below said opening, a frame slidably mounted below said opening, said frame extending upwardly into said oven and spaced from the oven walls bordering said opening, said frame carrying a longitudinally extending baffle positioned over said opening and spaced from the edges thereof, said frame and baffle adapted to be horizontally slidably withdrawn from said oven when said door is open, and said baffle, when in position within said oven, adapted to cause the gases heated by said source of heat to travel upwardly along the sides of said oven.

5. In combination, an oven including walls and closed at one end and having a door at the other end, a longitudinally extending opening through the bottom of said oven, a source of heat positioned below said opening, a housing about said source of heat, a supporting structure mounted in said opeing independently of said oven walls, said structure having upwardly extending members of small cross-sectional area in respect to said opening leading to the interior of said oven to a point substantially above the level of the walls at said opening, a cooking surface carried by said members and removable therefrom, a baffle carried by said structure between said cooking surface and said oven opening to cause lateral distribution of heat from said source of heat, said supporting structure, baffle and cooking surface adapted to be withdrawn from said oven as a unit when said oven door is open without materially changing the area of said bottom opening.

6. In combination, an oven closed at one end and having a door adapted to close the other end, said oven having an opening through its bottom which extends substantially the entire length thereof and leads directly to the interior area of said oven, side walls depending from the edges of said opening, a bottom joining said walls, a burner positioned in the area formed by said side walls and bottom and below said opening, a supporting frame mounted below said opening and within the confines of said walls and bottom and extending upwardly through and free of said opening, and a baffle carried by said frame and generally conforming to the curvature of the bottom portion of said oven, said baffle located immediately above said burner and overlying and spaced from those parts of the oven wall that are immediately adjacent said opening whereby substantially all of the hot gases generated by said burner will flow through said opening and thence laterally into said oven interior.

7. In combination, an oven having a longitudinally extending bottom opening leading directly to the interior of said oven, a source of heat positioned below said opening, a withdrawable frame substantially horizontally slidably mounted below and independent of said opening and extending upwardly through and spaced from the oven wall forming said opening, and a pan carried by said frame and located over and longitudinally of said opening, the sides of the bottom of said pan overlying the portion of the oven wall forming said opening in spaced relation thereto.

8. In combination, an oven having a longitudinally extending bottom opening leading directly to the interior area of said oven, a source of heat positioned below said opening, a withdrawable frame mounted below and independently of said opening and extending upwardly through and free of the oven walls forming said opening, a baffle conforming to the oven walls adjacent said opening and positioned over said opening and overlying the oven wall surfaces adjacent said opening in spaced substantially parallel relationship, whereby heated gases from said source of heat will flow freely laterally into said interior area, and a cooking surface positioned above said baffle and extending longitudinally a substantial part of the length of said opening, said baffle and cooking surface carried by said frame whereby they may be withdrawn together from said oven without materially changing the area of said bottom opening.

9. The combination of an oven having a longitudinal opening through its bottom and a frame adapted to carry a cooking surface in said oven, said frame comprising guides located below said opening and fixed with respect to said oven, cooperating base members movable longitudinally of said oven and directed by said guides whereby said members may be substantially withdrawn from said oven, upwardly extending members passing through said opening into said oven and connected to said base members and carrying on their upper ends a support, a transversely extending baffle carried by said support and located over said opening, a cooking surface carried by said support above said baffle, said frame, baffle, and cooking surface adapted to be withdrawn as a unit from said oven.

FRANK H. SCHNEIDER.

REFERENCES CITED

The following references are of record in the file of this patent:

UNITED STATES PATENTS

| Number | Name | Date |
|---|---|---|
| 3,076 | Hayward et al. | May 8, 1843 |
| 11,010 | Hill | June 6, 1854 |
| 12,434 | Blake | Feb. 27, 1855 |
| 821,487 | Hammack | May 22, 1906 |
| 993,241 | Glover | May 23, 1911 |
| 1,150,172 | Chadwick | Aug. 17, 1915 |
| 1,204,130 | Carter et al. | Nov. 7, 1916 |
| 1,239,341 | Bird | Sept. 4, 1917 |
| 1,717,222 | Kahn | June 11, 1929 |
| 1,961,332 | Burche et al. | June 5, 1934 |
| 1,986,017 | Schneider | Jan. 1, 1935 |
| 2,011,189 | Anderson | Aug. 13, 1935 |
| 2,088,957 | Hoffstetter et al. | Aug. 3, 1937 |
| 2,102,352 | Bilde | Dec. 14, 1937 |
| 2,157,608 | Hoffstetter et al. | May 9, 1939 |
| 2,207,358 | Rogers | July 9, 1940 |
| 2,358,034 | Schweller et al. | Sept. 12, 1944 |

FOREIGN PATENTS

| Number | Country | Date |
|---|---|---|
| 125,495 | Germany | Dec. 2, 1901 |
| 509,704 | France | Aug. 24, 1920 |